(12) United States Patent
Wakayama et al.

(10) Patent No.: US 10,377,089 B2
(45) Date of Patent: Aug. 13, 2019

(54) BONDED PART, MANUFACTURING METHOD OF BONDED PART, INK TANK, AND INK CARTRIDGE

(71) Applicant: CANON KABUSHIKI KAISHA, Tokyo (JP)

(72) Inventors: Hiroki Wakayama, Kawasaki (JP); Motohiro Watanabe, Saitama (JP); Toshiyuki Tomita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/673,288

(22) Filed: Aug. 9, 2017

(65) Prior Publication Data
US 2018/0043626 A1 Feb. 15, 2018

(30) Foreign Application Priority Data

Aug. 12, 2016 (JP) ................................. 2016-158630
Jul. 14, 2017 (JP) ................................. 2017-138546

(51) Int. Cl.
| | |
|---|---|
| *B65D 6/02* | (2006.01) |
| *B29C 65/00* | (2006.01) |
| *B29C 45/00* | (2006.01) |
| *B41J 2/175* | (2006.01) |
| *B29C 33/00* | (2006.01) |
| *B29C 33/40* | (2006.01) |

(52) U.S. Cl.
CPC .......... *B29C 66/71* (2013.01); *B29C 45/0062* (2013.01); *B29C 66/532* (2013.01); *B29C 66/7252* (2013.01); *B29C 66/7292* (2013.01); *B41J 2/175* (2013.01); *B41J 2/17513* (2013.01); *B41J 2/17553* (2013.01); *B41J 2/17559* (2013.01); *B29C 33/0022* (2013.01); *B29C 33/40* (2013.01); *B29C 66/49* (2013.01)

(58) Field of Classification Search
CPC .......... B65D 11/20; B65D 2501/24146; B65D 2501/24152; B65D 15/24; B29C 45/0062; B29C 66/532; B29C 66/7252
USPC ....................................... 220/613, 678, 4.28
See application file for complete search history.

(56) References Cited

U.S. PATENT DOCUMENTS 2,951,613 A * 9/1960 Hardigg ................... B65D 7/44
217/65

FOREIGN PATENT DOCUMENTS

JP 3-67056 A 3/1991

* cited by examiner

*Primary Examiner* — Stephen J Castellano
(74) *Attorney, Agent, or Firm* — Canon U.S.A., Inc. IP Division (57) ABSTRACT

In order to provide a bonded part capable of reducing deformation caused by injection pressure of bonding resin and preventing an increase in cost, the bonded part includes a first part, a second part, and a third part, wherein the first part includes a wall portion and a hollow portion surrounded by the wall portion, wherein a first shape portion formed of bonding resin is arranged at a position between the second part and the wall portion, wherein a second shape portion formed of the bonding resin is arranged at a position between the wall portion and the third part, and wherein a third shape portion formed of the bonding resin which connects the first shape portion and the second shape portion is arranged on the wall portion.

17 Claims, 11 Drawing Sheets

BONDED PART, MANUFACTURING METHOD OF BONDED PART, INK TANK, AND INK CARTRIDGE

BACKGROUND OF THE INVENTION

Field of the Invention

The present disclosure relates to a bonded part formed by bonding a first part having a hollow portion, a second part, and a third part with injected bonding resin, a manufacturing method of the bonded part, an ink tank, and an ink cartridge.

Description of the Related Art

In a molding method such as injection molding, a desired molded product is obtained by repeatedly performing a series of manufacturing operations of supplying fused material to a cavity space inside a mold, cooling down and solidifying the material within the mold, and taking out the molded product from the mold through an ejector mechanism. Typically, blow molding is performed when a hollow shape portion is formed by the injection molding. However, with the blow molding, it is not possible to provide a certain function to the hollow shape portion by arranging a partition or a certain member inside the hollow shape portion.

Therefore, for example, in a case where the hollow shape portion is formed by combining a container and a cover, and a certain function is to be provided to the inner portion thereof, the container and the cover are firstly manufactured through injection molding by using respective molds. Then, in the post-processing, the respective parts are bonded together by ultrasonic welding or vibration welding, so that a hollow shape part having a function in the inner portion thereof can be obtained. Further, in the in-mold assembling represented by die slide injection molding (DSI), two or more parts previously manufactured by primary molding are assembled by a certain method, and a bonded shape is manufactured by secondary molding through injection molding. Through the above operation, a complex shape can be realized on the inside of the part through injection molding.

Further, in the in-mold assembling, in most cases, a hollow shape part is manufactured by bonding two parts. However, there is a case where the hollow shape part is manufactured by combining and bonding three or more parts. In a case where three or more parts are to be bonded together but bonding portions of respective parts are not adjacent to each other, bonding resin can be filled into only necessary bonding portions by providing gates at two or more places. However, if the gates are provided at two or more places, a structure of the mold becomes complicated, so that cost of the mold will be increased. Therefore, it is desirable that molding be performed with a single gate. Accordingly, in the manufacturing method of a synthetic resin manifold, three parts such as a gas suction portion, a delivery pipe portion, and a cylinder head bonding portion are set to a mold inside an injection molding machine in order to bond the parts together. Then, the three parts are integrally molded by providing a coating layer on the surfaces through insert molding (see Japanese Patent Application Laid Open No. 3-67056).

However, when the three parts are integrally formed into a hollow shape part through a method described in Japanese Patent Application Laid Open No. 3-67056, the outer wall surface of the hollow shape part has to be thoroughly molded with bonding resin. At this time, pressure caused by injected bonding resin is applied to the hollow shape part not having the mold arranged inside thereof, so that there is a risk of the molded part being considerably deformed toward the inside thereof. As a solution to the above issue, for example, there is provided a method in which rigidity of the hollow shape part is retained by freezing the hollow shape part with nitrogen gas, or by freezing water filled in the hollow shape part. However, as it is necessary to introduce new facilities or new processing steps, employing the above-described method is not realistic because this may result in increased manufacturing cost.

SUMMARY OF THE INVENTION

Therefore, the present disclosure is directed to a bonded part and a manufacturing method of the bonded part capable of reducing deformation caused by injection pressure of bonding resin and preventing an increase in cost when three parts are formed into an integrated part.

According to an aspect of the present disclosure, a bonded part according to the present disclosure includes a first part, a second part, and a third part, wherein the first part includes a wall portion and a space portion surrounded by the wall portion, wherein a first shape portion formed of bonding resin is arranged at a position between the second part and the wall portion, wherein a second shape portion formed of the bonding resin is arranged at a position between the wall portion and the third part, and wherein a third shape portion formed of the bonding resin which connects the first shape portion and the second shape portion is arranged on the wall portion.

According to another aspect of the present disclosure, a manufacturing method of a bonded part according to the present exemplary embodiment includes inserting a first part, a second part bonded on one side of the first part with bonding resin at a first bonding portion, and a third part bonded on another side of the first part with bonding resin at a second bonding portion into a mold, and filling bonding resin to the first bonding portion, a communication path that communicates the second bonding portion, and the second bonding portion by injecting resin to a hole provided on the second part.

According to the present disclosure while the first part, the second part, and the third part can be formed into an integrated part with bonding resin injected from a single gate hole, for example, deformation of the first part caused by injection pressure of the bonding resin can be reduced. Further, as it is not necessary to introduce new facilities or new processing steps for retaining the rigidity of the first part, an increase in manufacturing cost can be prevented.

Further features of the present disclosure will become apparent from the following description of exemplary embodiments with reference to the attached drawings.

BRIEF DESCRIPTION OF THE DRAWINGS

FIGS. 1A, 1B, and 1C are diagrams illustrating a hollow part according to a first exemplary embodiment.

FIGS. 5A and 5B are diagrams illustrating a hollow part according to a second exemplary embodiment. FIG. 5A is an exploded perspective diagram of the hollow part, whereas

FIGS. 6A and 6B are diagrams illustrating a hollow part according to a third exemplary embodiment.

FIGS. 9A and 9B are diagrams illustrating a hollow part according to a fourth exemplary embodiment.

FIGS. 11A, 11B, and 11C are diagrams illustrating a hollow part according to another exemplary embodiment.

DESCRIPTION OF THE EMBODIMENTS

Figure 1A:
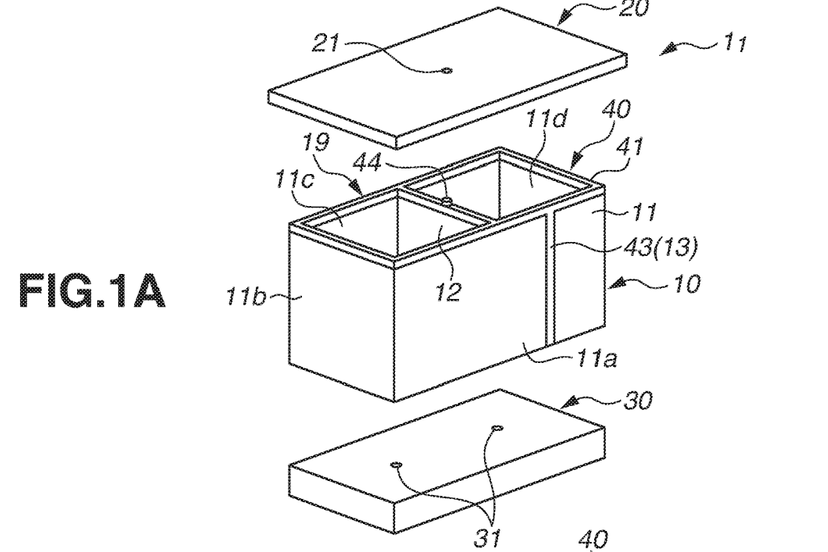
FIG. 1A is an exploded perspective diagram of the hollow part.
Figure 1B:
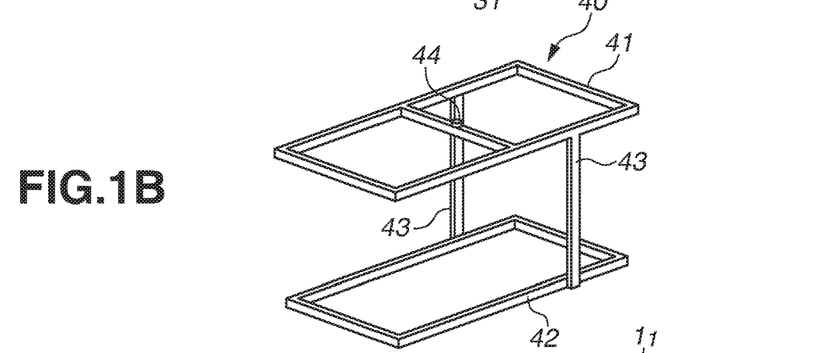
FIG. 1B is a partial schematic perspective diagram illustrating only a portion of bonding resin.
Figure 1C:
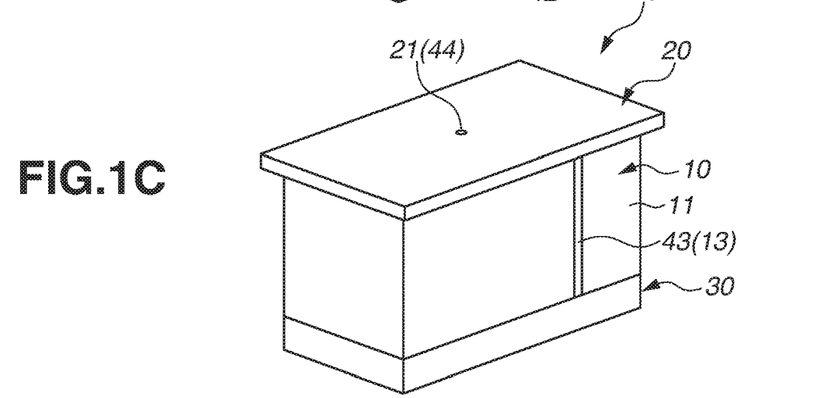
FIG. 1C is an external perspective diagram of the hollow part.
Figure 2:
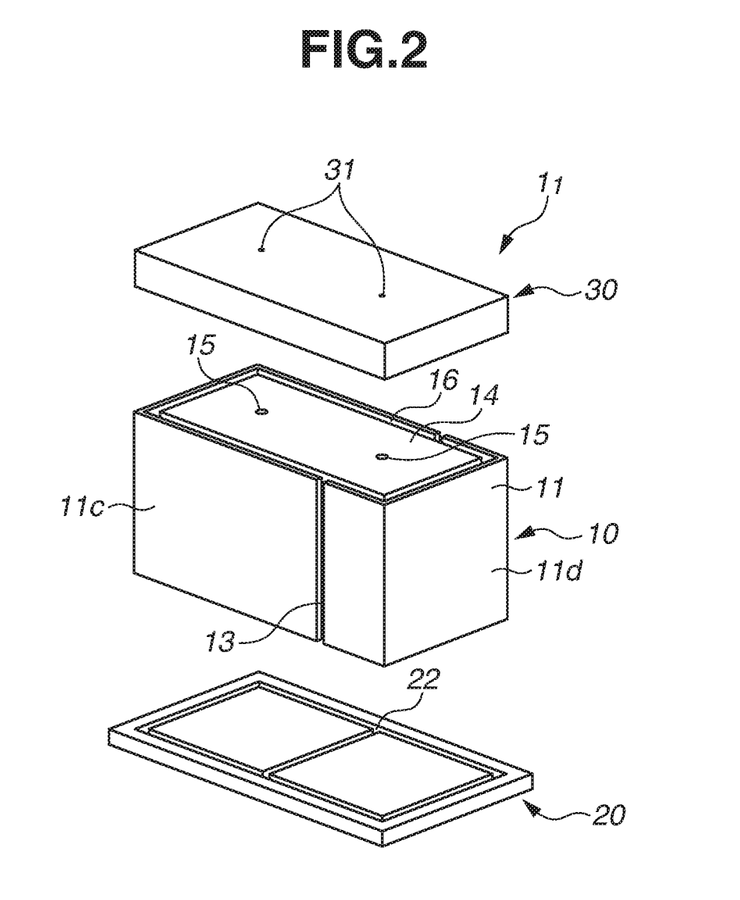
FIG. 2 is an exploded perspective diagram illustrating a state before bonding the hollow part according to the first exemplary embodiment.
Figure 3:
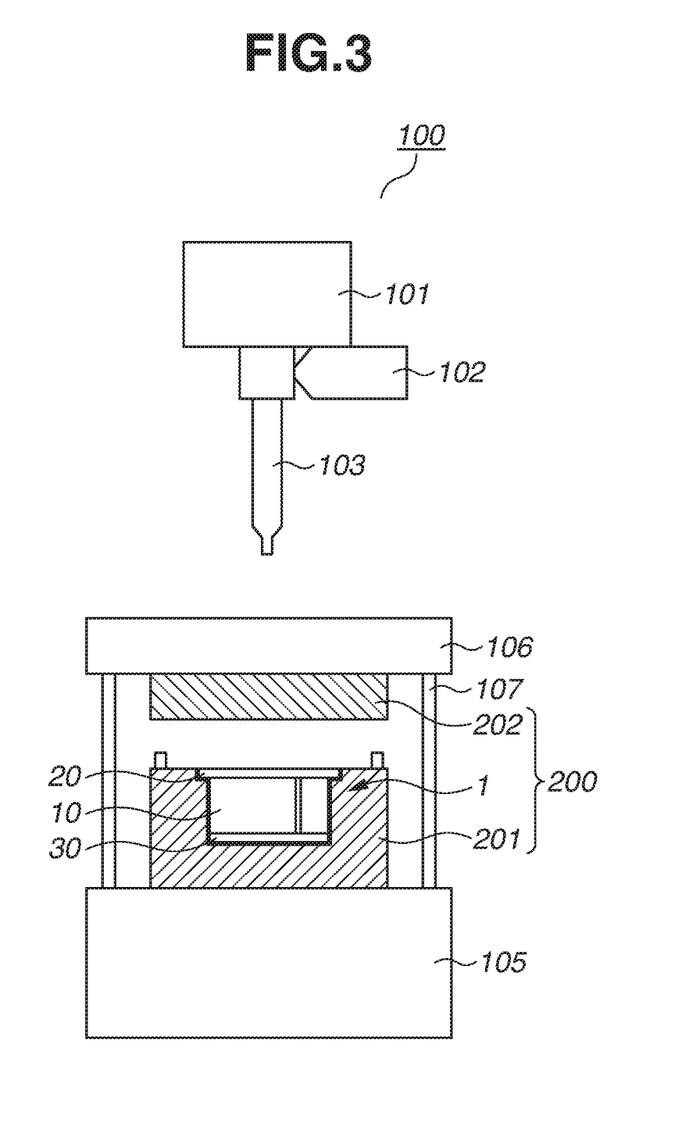
FIG. 3 is a schematic diagram illustrating an injection molding machine and a mold.
Figure 4:
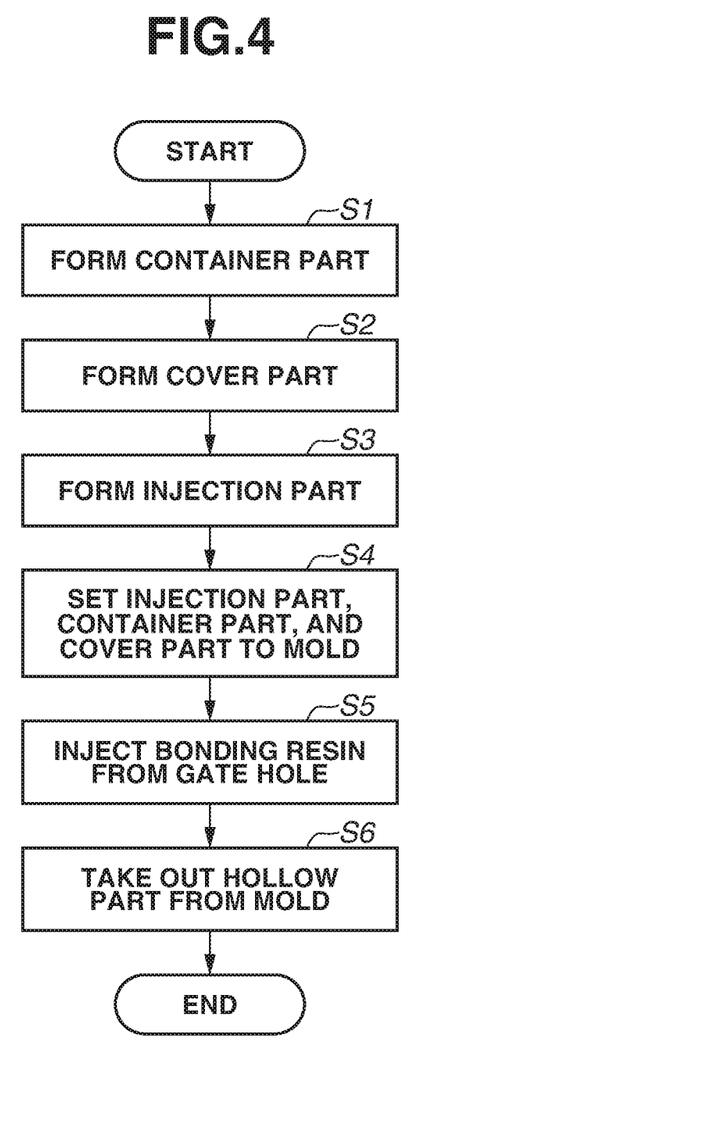
FIG. 4 is a flowchart illustrating manufacturing processing of the hollow part.

Hereinafter, a first exemplary embodiment to which the present disclosure is applicable will be described with reference to FIG. 1 (consisting of FIG. 1A to 1C) to 4. FIGS. 1A, 1B, and 1C are diagrams illustrating a hollow part according to the present exemplary embodiment in which a communication path is formed on a wall portion. FIG. 1A is an exploded perspective diagram of the hollow part, FIG. 1B is a partial schematic perspective diagram illustrating only a portion of bonding resin, and FIG. 1C is an external perspective diagram of the hollow part. FIG. 2 is an exploded perspective diagram illustrating a state before bonding the hollow part according to the present exemplary embodiment. FIG. 3 is a schematic diagram illustrating an injection molding machine and a mold, and FIG. 4 is a flowchart illustrating manufacturing processing of the hollow part.

As illustrated in FIG. 1A, a hollow part 1: according to the present exemplary embodiment is a bonded part including three parts, i.e., a container part 10 as an example of a first part, a cover part 20 as an example of a second part, and an injection part 30 as an example of a third part, which are bonded to each other. The container part 10 includes a wall portion 11 that forms a hollow portion 19 having a hollow shape. The wall portion 11 includes four side walls 11a, 11b, 11c, and 11d which are molded integrally, so that the wall portion 11 is formed into a rectangular shape when viewed from a side of a first shape portion 41 to which the cover part 20 described below is bonded. In addition, a partition wall portion 12 may be integrally coupled to the inner side of the side walls 11a and 11c of the wall portion 11. This partition wall portion 12 can divide the hollow portion 19 into two rooms. In the present exemplary embodiment, although an example in which the hollow portion 19 is divided into two rooms by the partition wall portion 12 will be described, the exemplary embodiment is not limited to the above, and the partition wall portion 12 does not have to be provided or the hollow portion 19 may be divided into three or more rooms by a plurality of partition wall portions.

On the other hand, as illustrated in FIG. 2, a bottom wall 14 is integrally molded on an end portion of the wall portion 11 at a bottom of the container part 10, and a through-hole 15 is provided on the bottom wall 14 so as to penetrate through a position corresponding to the hollow portion 19. This through-hole 15 is arranged at a position corresponding to a through-hole 31 provided on an injection part 30 described below. In the present exemplary embodiment, because the hollow portion 19 is divided into two rooms, through-holes 15 are provided so as to penetrate through positions corresponding to the two rooms. However, the exemplary embodiment is not limited thereto, and only one through-hole 15 may be provided if the hollow portion 19 has a single room without having the partition wall portion 12. Further, the bottom wall 14 does not have to be formed on the container part 10 (first part), or may be formed partially.

Further, a bottom groove 16 formed in a groove shape is provided on an edge portion of the bottom wall 14 on the inner side of the wall portion 11, continuously along a perimeter of the bottom wall 14. Then, a communication groove 13 which communicates with the bottom groove 16 and serves as a communication path for communicating with the below-described cover groove 22 of the cover part 20 when the container part 10 and the cover part 20 are combined, is formed on each of the side walls 11a and 11c of the wall portion 11. In the present exemplary embodiment, although an example in which the communication grooves 13 are formed at two places will be described, a configuration is not limited thereto, and the number of the communication grooves 13 may be determined as appropriate according to a filling state of resin by performing simulations.

For example, the container part 10 has lengths of 54 mm in the longitudinal direction and 27 mm in the breadthwise direction, and a height of 26 mm, while each of the wall portion 11, the partition wall portion 12, and the bottom wall 14 has a thicknesses of 1.6 mm. Further, for example, the bottom groove 16 has a width of 1.6 mm and a height of 1.5 mm, whereas the communication groove 13 has a width of 1.8 mm and a height of 1 mm. Then, a resinous material used for the container part 10 consists of polyphenylether (PPE), polystyrene (PS), and 35% of glass fiber (GF).

As illustrated in FIGS. 1A and 2, the cover part 20 is a member formed in a plate state, which is bonded to one side of the container part 10. Further, a cover groove 22 formed in a groove shape is provided on the back side of the cover part 20, continuously along a perimeter of a portion that faces the edge faces of the side walls 11a, 11b, 11c, and 11d of the wall portion 11 when the cover part 20 is combined with the container part 10. In a case where the partition wall portion 12 is formed, the cover groove 22 formed in a groove shape is provided continuously along a perimeter of a portion that faces the edge faces of the side walls 11a, 11b, 11c, and 11d, and the partition wall portion 12 of the wall portion 11. Then, a gate hole 21 that enables bonding resin to be injected to the cover groove 22 is provided on a front side of the cover part 20 so as to penetrate through the cover groove 22.

For example, the cover part 20 has lengths of 60 mm in the longitudinal direction and 30 mm in the breadthwise direction, and a thickness of 2.5 mm. Further, for example, the cover groove 22 has a width of 1.6 mm and a height of 1.5 mm. Then, similar to the container part 10, a resinous material used for the cover part 20 consists of PPE, PS, and 35% or GF, for example.

On the other hand, as illustrated in FIGS. 1A and 2, the injection part 30 is a member formed in a plate state and bonded to another side (a side opposite to the cover part 20) of the container part 10. Further, through-holes 31 are provided on the injection part 30 so as to penetrate through the positions corresponding to the through-holes 15 provided in and penetrating through the bottom wall 14 of the container part 10. In other words, the through-holes 31 are formed so as to make a liquid previously stored in each of the two rooms in the hollow portion 19 flow into an appropriate position outside the hollow part $1_1$ when pressure is applied to the hollow portion 19.

For example, the injection part 30 has lengths of 54 mm in the longitudinal direction and 27 mm in the breadthwise direction, and a thickness of 6 mm. Then, similar to the container part 10 and the cover part 20, a resinous material used for the injection part 30 consists of PPE, PS, and 35% or GF, for example.

Next, configurations of an injection molding machine 100 and a mold 200 will be described. As illustrated in FIG. 3, the mold 200 includes a fixed mold 201 for inserting and setting the hollow part $1_1$ to a cavity and a movable mold 202 for closing and covering the cavity by joining with the fixed mold 201. On the other hand, the injection molding machine 100 includes a platform 105 for fixing the fixed mold 201, a movable platform 106 for fixing the movable mold 202, and tie-bars 107 for enabling the movable platform 106 to move with respect to the platform 105. Further the injection molding machine 100 includes an injection apparatus 101 capable of generating injection pressure of, for example, 180 t, a hopper 102 for setting and supplying a material of bonding resin, and a nozzle 103 for injecting the bonding resin stored in the hopper 102 from a leading end through the pressure from the injection apparatus 101. The injection apparatus 101, the hopper 102, and the nozzle 103 constitute an injection unit. Further, a hole (not illustrated) to which the nozzle 103 can be inserted is formed on each of the movable platform 106 and the movable mold 202, so that the leading end of the nozzle 103 is moved so as to reach the gate hole 21, and the bonding resin is injected from the nozzle 103.

In addition, the injection molding machine 100 thus configured has a size of a general injection unit. Therefore, with the size of the hollow part $1_1$, it is difficult to inject bonding resin to the hollow part $1_1$ from two or more places by arranging the two or more nozzles in parallel, for example. Further, it is not preferable that the injection units be provided on the platform 105 and the fixed mold 201 side because a size of the injection molding machine 100 as well as the cost will be increased. Therefore, in the present exemplary embodiment, bonding resin is injected from one place.

Further, in FIG. 3, although an exemplary embodiment in which the bonding resin is injected from the nozzle 103 of the injection molding machine 100 is illustrated, the exemplary embodiment is not limited thereto. It is also possible to use a simplified resin injection apparatus. Specifically, a nozzle of the simplified resin injection apparatus is brought into contact with the gate hole 21, so that the bonding resin is injected therefrom.

Subsequently, manufacturing processing of the hollow part $1_1$ will be described. As illustrated in FIG. 4, in step S1, the container part 10 is formed by injecting resin to a mold of the container part 10 (i.e., first part forming processing).

The shapes of the through-hole 15, the bottom groove 16, and the communication groove 13 are formed on the mold of the container part 10 together with the shapes of the wall portion 11, the partition wall portion 12, and the bottom wall 14, so that the bottom groove 16 and the communication groove 13 are formed simultaneously when the container part 10 is formed.

Next, in step S2, the cover part 20 is formed by injecting resin to a mold of the cover part 20 (i.e., second part forming processing). The shapes of the gate hole 21 and the cover groove 22 are formed on the mold of the cover part 20, so that the gate hole 21 and the cover groove 22 are formed simultaneously when the cover part 20 is formed. Further, in step S3, the injection part 30 is formed by injecting resin to a mold of the injection part 30 (i.e., third part forming processing). A shape of the through-hole 31 is formed on the mold of the injection part 30, so that the through-hole 31 is formed simultaneously when the injection part 30 is formed.

In addition, the container part 10, the cover part 20, and the injection part 30 are formed independently at different places, and the respective pieces of part forming processing may be executed in any processing order. Further, respective parts 10 to 30 may be manufactured through family molding by using a single mold including respective cavities of the container part 10, the cover part 20, and the injection part 30.

Next, in step S4, the injection part 30, the container part 10, and the cover part 20 are sequentially set (inserted) to the fixed mold 201 of the mold 200 serving as a bonding mold by using an articulated robot or another conveyance unit (insert processing). When the cavity is closed by moving the movable mold 202, the injection part 30, the container part 10, and the cover part 20 are brought into an assembled state. In this state, in step S5, bonding resin is injected to the gate hole 21 from the nozzle 103 (filling processing). With this processing, the bonding resin injected from the gate hole 21 flows into the cover groove 22, the communication groove 13 covered by the fixed mold 201, and the bottom groove 16, so that the bonding resin is introduced and filled in the grooves. After the bonding resin is filled in the grooves, the mold 200 is kept under a pressure of 50 MPa, for example, (i.e., dwelling processing) and cooled thereafter (i.e., cooling processing), so that a bonding resin shape portion 40 is formed as illustrated in FIGS. 1A and 1B. The bonding resin shape portion 40 includes a first shape portion 41, a second shape portion 42, and a third shape portion 43. The first shape portion 41 is formed of bonding resin at a position between the second part (cover part 20) and the wall portion 11. In other words, the first shape portion 41 is formed at a position between the edge face of the wall portion 11 and the cover groove 22 of the cover part 20. In a case where the partition wall portion 12 is provided, the first shape portion 41 is formed at a position between respective edge faces of the wall portion 11 and the partition wall portion 12 and the cover groove 22 of the cover part 20. The second shape portion 42 is formed of the bonding resin at a position between the wall portion 11 and the third part. In other words, the second shape portion 42 is formed at a position between the bottom groove 16 and an inner face of the injection part 30. Then, the third shape portion 43 serving as a communication portion for connecting the first shape portion 41 and the second shape portion 42 is formed on the wall portion 11. The first shape portion 41 includes a convex portion 44 that passes through an internal portion of the second part and penetrates to an opposite side of the first part. The injection part 30 as the third part, the container part 10 as the first part, and the cover part 20 as the second part are integrated and bonded together by the bonding resin shape portion 40, so as to constitute the hollow part $1_1$ illustrated in FIG. 1C. Then, in step S6, the mold 200 is opened, and the integrated hollow part $1_1$ is taken out from the mold 200.

In the present exemplary embodiment, a bonding mold is prepared and used separately from the molds of the container part 10, the cover part 20, and the injection part 30. However, the mold of the injection part 30 may be used as the fixed mold 201 because the injection part 30 is inserted on the lowermost side. In other words, a mold of a part that is to be arranged on the lowermost side of the mold when the hollow part $1_1$ is assembled may be used as the bonding mold. Further, in a case where the container part 10, the cover part 20, and the injection part 30 are manufactured by a single mold through family molding, a cavity of a part arranged at a deepest position of the mold when the hollow part $1_1$ is inserted therein may be used as a bonding cavity. Further, when the mold (including a family mold) used for manufacturing the parts is also used for bonding the parts, e.g., when the parts are inserted to the movable mold, the fixed mold has to be changed to the bonding mold. On the contrary, for example, when the part is inserted to the fixed mold, the movable mold has to be changed to the bonding mold. The mold may be changed manually, or may be changed through DSI or other methods.

As described above, in the present exemplary embodiment, the integrated hollow part $1_1$ can be formed by injecting the bonding resin from the single gate hole 21. Further, when the hollow part $1_1$ is formed integrally, the first shape portion 41 and the second shape portion 42 are molded via the communication groove 13 instead of the bonding resin being filled into the entire external face of the container part 10. With this processing, injection pressure is not applied to the entire wall portion 11 but applied to only a part of the side walls 11a and 11c. Therefore, injection pressure applied to the container part 10 having the hollow portion 19 can be reduced, so that deformation of the container part 10, i.e., deformation of the hollow part $1_1$ can be reduced. Further, because freezing the container part 10 with nitrogen gas or filling water into the container part 10 to be frozen therein is not necessary, it is not necessary to introduce or increase new facilities or new processing steps for retaining rigidity of the container part 10, so that an increase in cost can be prevented.

Figure 5A:
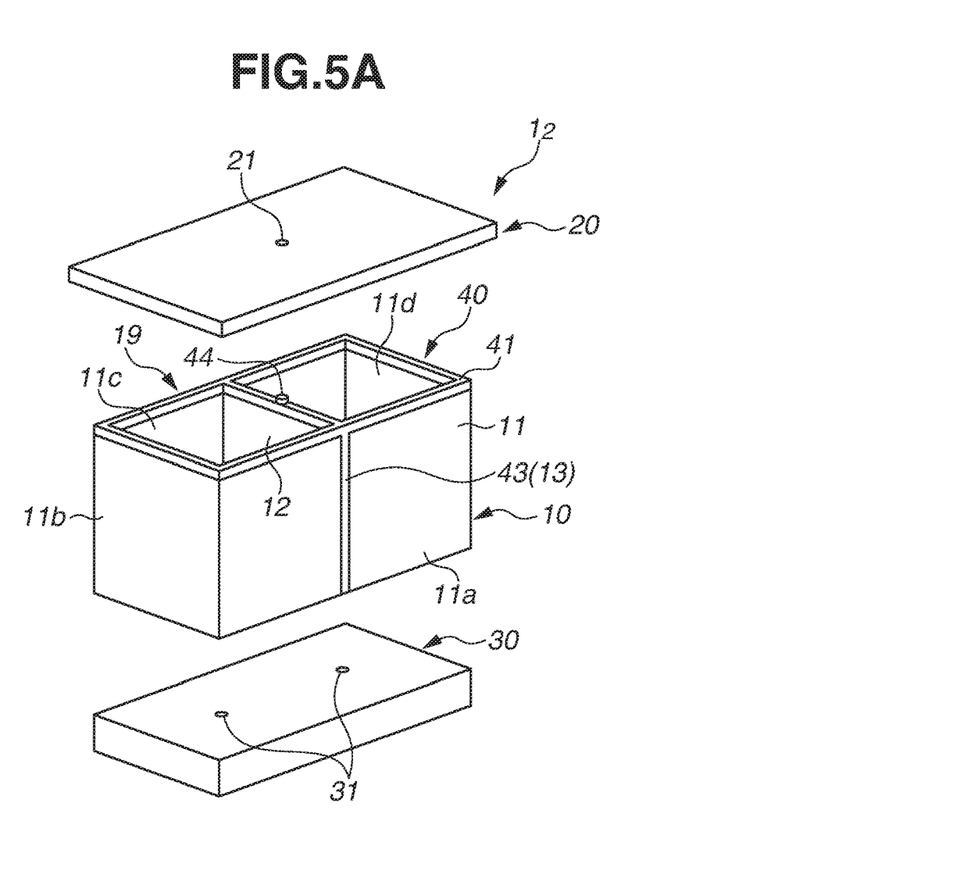
Figure 5B:
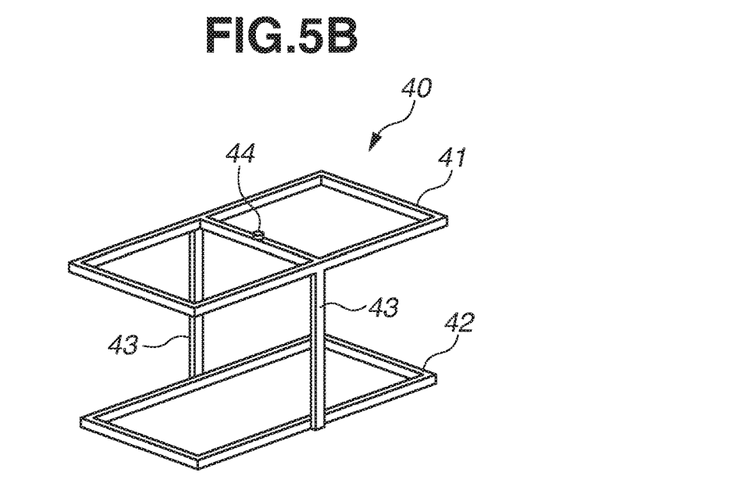
FIG. 5B is a partial schematic perspective diagram illustrating only a portion of bonding resin.

Next, a second exemplary embodiment in which the first exemplary embodiment is partially changed will be described with reference to FIGS. 5A, 5B, 6A, and 6B. FIGS. 5A and 5B are diagrams illustrating a hollow part according to the present exemplary embodiment in which a communication path is formed at a position corresponding to an outer side of a partition wall of a wall portion. FIG. 5A is an exploded perspective diagram of the hollow part, whereas FIG. 5B is a partial schematic perspective diagram illustrating only a portion of bonding resin.

As illustrated in FIG. 5A, a hollow part $1_2$ according to the present exemplary embodiment includes a communication groove 13 provided on the wall portion 11 on the outer side of a portion to which the partition wall portion 12 is coupled (i.e., a position overlapping with a planar face including a plate thickness of the partition wall portion 12). With this configuration, when the bonding resin is injected and filled into the gate hole 21, as illustrated in FIGS. 5A and 5B, a communication portion 43 that communicates between the first shape portion 41 and the second shape portion 42 is formed on the bonding resin shape portion 40 at a portion on the outer side of the partition wall portion 12. At this time, the partition wall portion 12 functions as a reinforcing portion that supports the wall portion 11, so that deformation of the wall portion 11 caused by the injection pressure is suppressed, and thus deformation of the hollow part $1_2$ is reduced.

Configurations, manufacturing processing, and effects other than those described above are similar to those described in the first exemplary embodiment, so that description thereof will be omitted.

Figure 6A:
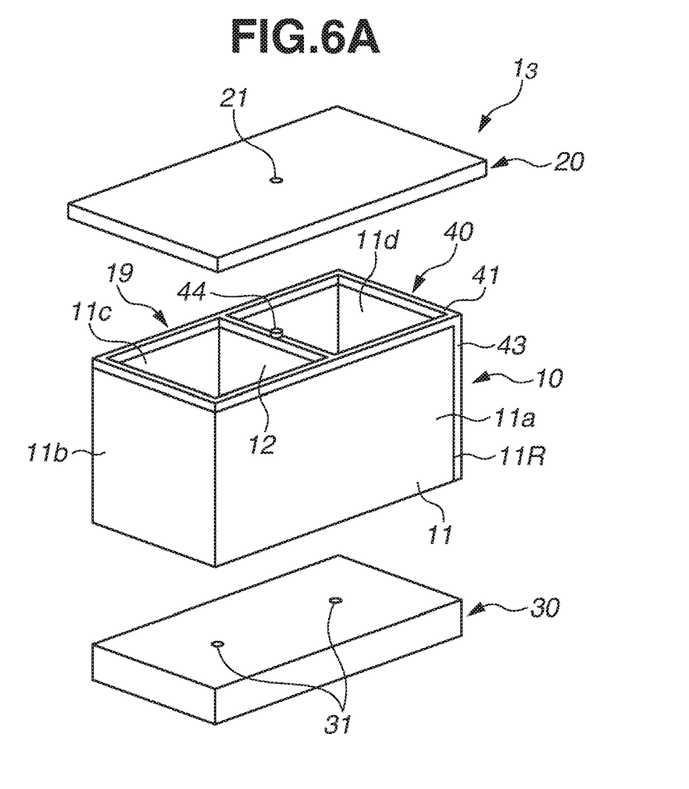
FIG. 6A is an exploded perspective diagram of the hollow part.
Figure 6B:
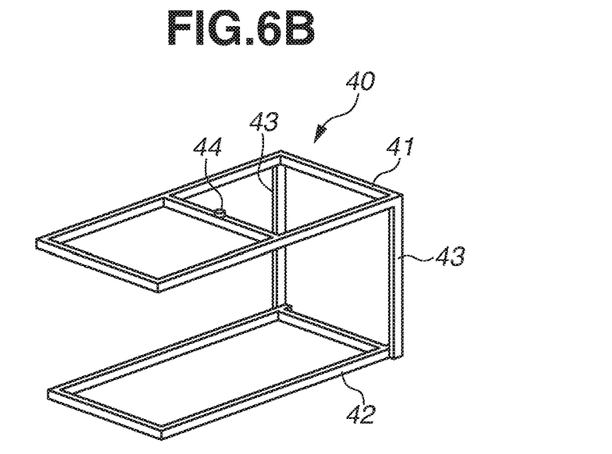
FIG. 6B is a partial schematic perspective diagram illustrating only a portion of bonding resin.

Next, a third exemplary embodiment in which the first and the second exemplary embodiments are partially changed will be described with reference to FIGS. 6A and 6B. FIGS. 6A and 6B are diagrams illustrating a hollow part according to the present exemplary embodiment, in which a communication path is formed on a wall portion, at a corner portion of a rectangular shape. FIG. 6A is an exploded perspective diagram of the hollow part, whereas FIG. 6B is a partial schematic perspective diagram illustrating only a portion of bonding resin.

As illustrated in FIG. 6A, a hollow part $1_3$ according to the present exemplary embodiment includes a communication groove 13 provided on a wall portion 11 at a corner portion 11R of the rectangular shape (i.e., a position where planer faces including plate thicknesses of the side walls 11a and 11d and plate thicknesses of the side walls 11c and 11d intersect with each other). With this configuration, when the bonding resin is injected and filled into the gate hole 21, as illustrated in FIGS. 6A and 6B, a communication portion 43 that communicates between the first shape portion 41 and the second shape portion 43 is formed on the bonding resin shape portion 40, at a portion corresponding to the corner portion 11R of the wall portion 11. At this time, the wall portion 11 is supported because the injection pressure is dispersed on the side walls 11a and 11d or the side walls 11c and 11d of the wall portion 11, so that deformation of the wall portion 11 is suppressed, and deformation of the hollow part $1_3$ is reduced.

Configurations, manufacturing processing, and effects other than those described above are similar to those described in the first and the second exemplary embodiments, so that description thereof will be omitted.

Next, a fourth exemplary embodiment in which the first, the second, and the third exemplary embodiments are partially changed will be described with reference to FIGS. 9A and 9B.

Figure 9A:
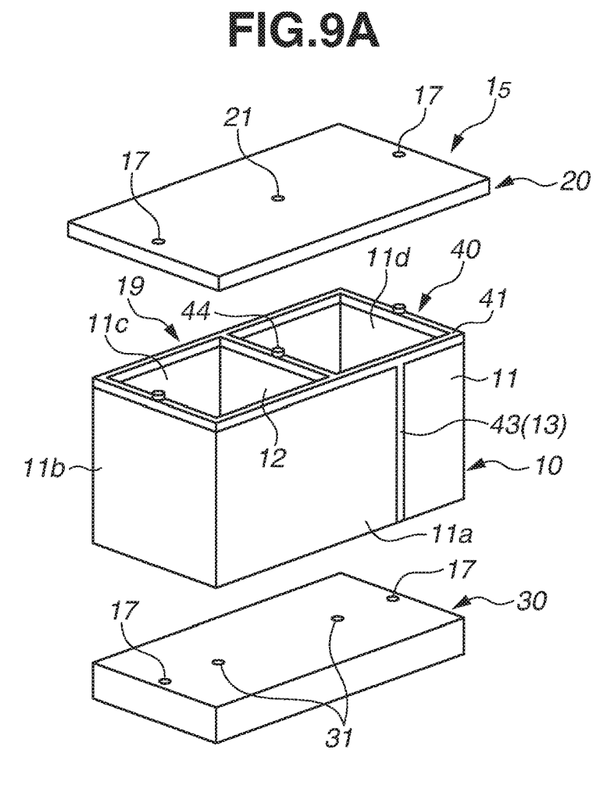
FIG. 9A is an exploded perspective diagram of the hollow part.
Figure 9B:
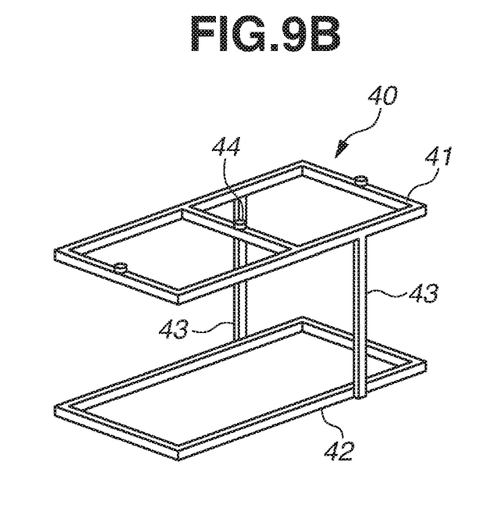
FIG. 9B is a partial schematic perspective diagram illustrating only a portion of bonding resin.

FIGS. 9A and 9B are diagrams illustrating a hollow part according to the present exemplary embodiment, in which a through-hole 17 penetrating to the fixed mold 201 or the movable mold 202 is provided on the cover groove 22 and the bottom groove 16. FIG. 9A is an exploded perspective diagram of the hollow part, whereas FIG. 9B is a partial schematic perspective diagram illustrating only a portion of bonding resin.

As illustrated in FIG. 9A, a hollow part $1_5$ according to the present exemplary embodiment has a through-hole 17 penetrating to the movable mold 202, which is formed on a part of the cover groove 22 formed in a groove shape continuously along a perimeter of on a back side of the cover part 20. Similarly, a through-hole 17 penetrating to the fixed mold 201 is also provided on a part of the injection part 30 and the second shape portion 42.

Bonding resin filled from the gate hole 21 flows into the cover groove 22, the communication groove 13 covered by the fixed mold 201, and the bottom groove 16, so that the parts are bonded together.

In the course of filling the bonding resin in the cover groove 22, the communication groove 13, and the bottom groove 16, the air existing inside the respective grooves has nowhere to go, so as to be eventually pushed to a last-filled portion. Because the air is partially compressed or partially discharged by penetrating through a minute gap, the bonding resin is completely filled up to the last-filled portion. However, the pressure greater than the pressure required for simply making the bonding resin flow into an end portion is required.

In the present exemplary embodiment, through-holes penetrating to the mold are provided on the groove portions, so that the air inside the groove portions are proactively discharged to the outside through a discharge passage within the mold. Therefore, an amount of the air compressed inside the grooves in the course of filling processing can be reduced, so that the bonding resin can easily flow into the last-filled portion, and thus the flowing pressure can be reduced.

With this configuration, in addition to the convex portion 44 passing through the internal portion of the second part and penetrating to the opposite side of the first part, which is formed by the gate, the first shape portion 41 is provided with one or more convex portions passing through the internal portion of the second part and penetrating to the opposite side of the first part.

Further, the second shape portion 42 is also provided with one or more convex portions passing through the internal portion of the third part and penetrating to the opposite side of the first part.

Configurations, manufacturing processing, and effects other than those described above are similar to those described in the first and the second exemplary embodiments, so that description thereof will be omitted.

<Comparison Among the First to the Third Exemplary Embodiments>

Next, deformation amounts of the container part 10 caused by injection pressure in the above-described first to the third exemplary embodiments and the comparison example and evaluation thereof will be described. Deformation amounts in the first to the third exemplary embodiments and the comparison examples and evaluation thereof are listed in Table 1 below. Herein, the deformation amount of 1 mm or less is evaluated as "Good", the deformation amount within a range of 1 to 2 mm is evaluated as "Fair", and the deformation amount of 2 mm or more is evaluated as "Poor". Further, a hollow part manufactured by integrating the container part 10, the cover part 20, and the injection part 30 by covering the outer surfaces thereof with resin is used as the comparison example.

TABLE 1

|  | Deformation Amount of Container Part (mm) | Evaluation |
| --- | --- | --- |
| First Exemplary Embodiment | 1.24 | Fair |
| Second Exemplary Embodiment | 0.26 | Good |
| Third Exemplary Embodiment | 0.32 | Good |
| Comparison Example | 12.57 | Poor |

As illustrated in the comparison example, when the resin is injected so as to entirely cover the hollow part, the container part 10 is deformed considerably because of the injection pressure. On the other hand, as illustrated in the first exemplary embodiment, when the communication groove 13 is formed on the wall portion 11 of the container part 10, the deformation amount can be reduced remarkably.

Further, as illustrated in the second exemplary embodiment, when the communication groove 13 is formed at a position on the outer side of the partition wall portion 12, the deformation amount is less than that of the first exemplary embodiment. Furthermore, as illustrated in the third exemplary embodiment, when the communication groove 13 is formed at the corner portion 11R of the wall portion 11, the deformation amount is also less than that of the first exemplary embodiment. A value of the deformation amount becomes smaller in an order of the first exemplary embodiment, the third exemplary embodiment, and the second exemplary embodiment.

<Comparison of Gate Positions>

Figure 7:
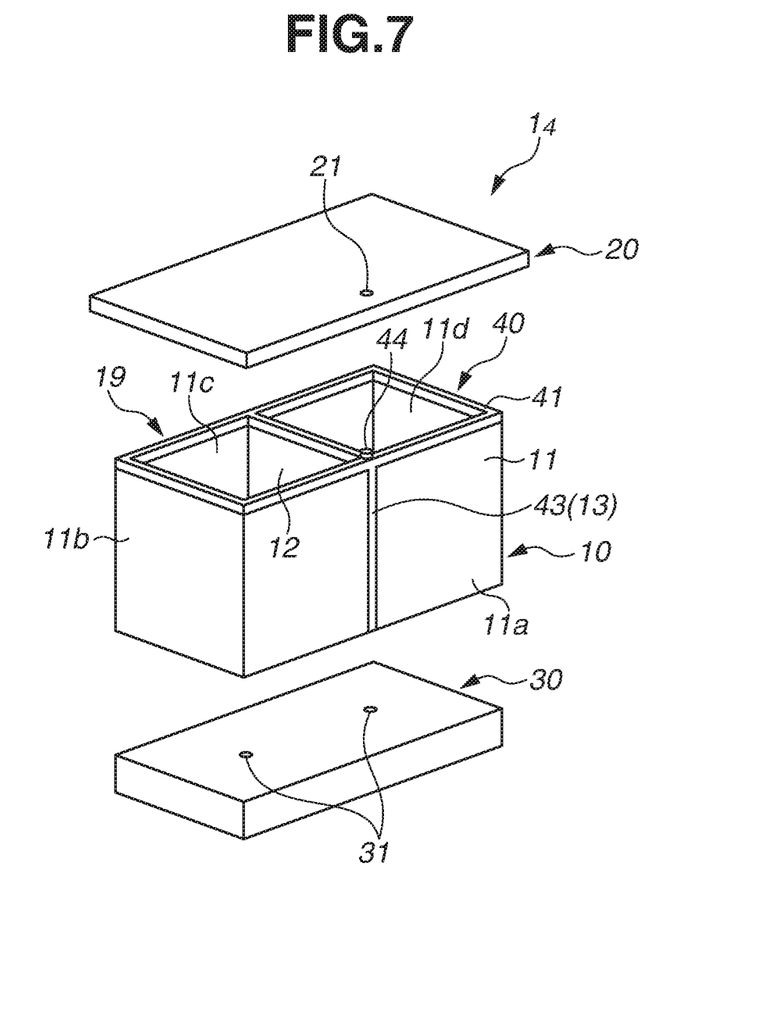
FIG. 7 is an exploded perspective diagram illustrating an example of a hollow part a gate position of which is changed.
Figure 8:
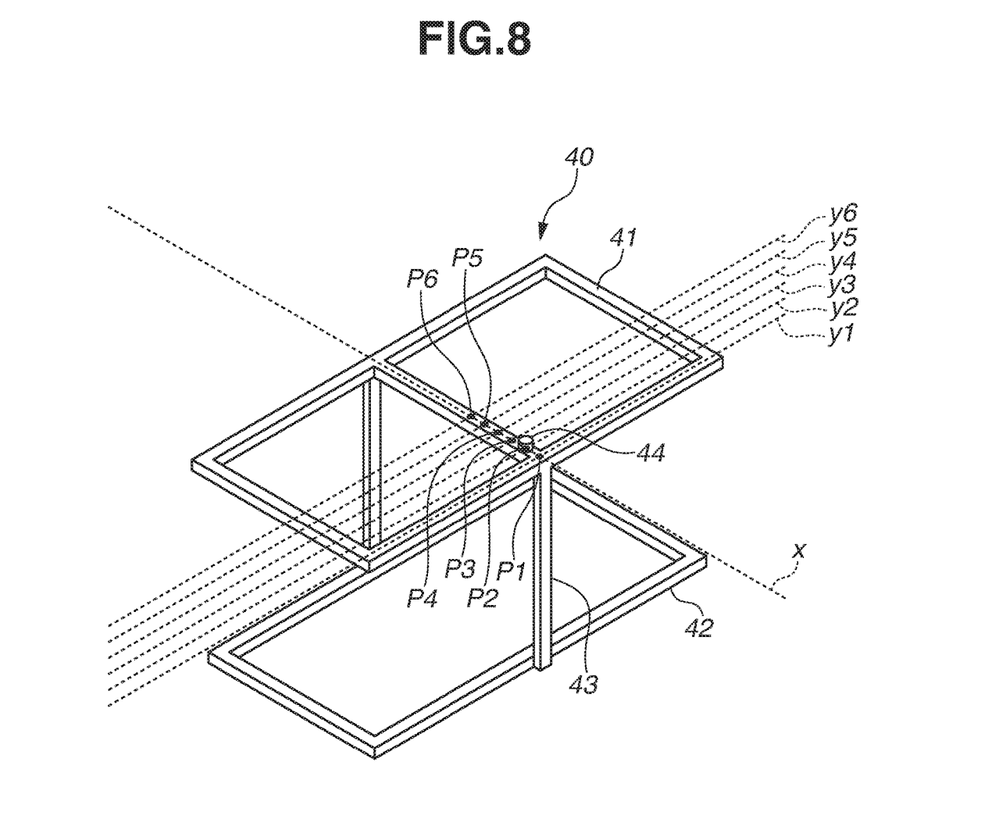
FIG. 8 is a partial schematic perspective diagram illustrating a bonding resin shape portion when a gate position is changed.

Next, injection pressure at completion of filling processing and evaluation thereof will be described with respect to a case where the gate position in the breadthwise direction of the hollow part 1 is changed. FIG. 7 is an exploded perspective diagram illustrating an example of a hollow part when a gate position is changed, and FIG. 8 is a partial schematic perspective diagram illustrating a bonding resin shape portion when a gate position is changed. In addition, a comparison between changed gate positions is made by using a hollow part similar to that of the second exemplary embodiment in which the communication groove 13 is formed on the outer side of the partition wall portion 12.

In a hollow part $1_4$ illustrated in FIG. 7, the gate hole 21 for injecting the bonding resin is provided at a position close to the communication groove 13 instead of at a central position in the breadthwise direction of a portion facing the edge face of the partition wall portion 12 (see FIG. 5A). If only the first shape portion 41 for bonding the container part 10 and the cover part 20 is taken into consideration, providing the gate hole 21 at a central position (i.e., center) is preferable in terms of the filling balance, and thus the injection pressure will be the lowest in normal cases. However, in a case where the second shape portion 42 is provided in addition to the first shape portion 41, while the first shape portion 41 and the second shape portion 42 communicate via the communication groove 13 formed on the wall portion 11 and positioned at an edge portion in the breadthwise direction of the rectangular shape, the filling balance will be different. In other words, a difference between the time taken to fill the bonding resin into the first shape portion 41 and the second shape portion 42 becomes smaller when the gate hole 21 is positioned close to the communication groove 13, so that the filling balance is improved, and thus the injection pressure at completion of filling processing becomes lower.

In order to make a comparison between the gate positions, as illustrated in FIG. 8, a region corresponding to the edge face of the partition wall portion 12 spanning from an edge portion in the breadthwise direction of the rectangular shape to a center thereof is divided into five sections, and six positions P1 to P6 are set thereto. In other words, the positions P1 to P6 correspond to intersections between a straight line x extending on the partition wall portion 12 in the breadthwise direction of the rectangular shape and straight lines y1 to y6 extending in parallel in the longitudinal direction of the rectangular shape, which divide the region spanning from the edge portion to the center in the breadthwise direction of the rectangular shape into five sections. Then, for the positions P1 to P6, distances between gate hole 21 to the communication groove 13, and evaluation thereof are listed in Table 2 below. Pressure applied to the bonding resin at completion of filling is evaluated as "Good" when a value thereof is 50 MPa or less, evaluated as "Fair" when a value thereof falls within a range of 50 to 60 MPa, and evaluated as "Poor" when a value thereof is 60 MPa or more. Naturally, filling conditions other than the above are set to be the same.

TABLE 2

| Position | Distance Between Communication Groove and Gate Hole (mm) | Injection Pressure at Completion of Charging (MPa) | Evaluation |
|---|---|---|---|
| P1 | 0 | 45.13 | Good |
| P2 | 2.2 | 46.44 | Good |
| P3 | 4.3 | 46.82 | Good |
| P4 | 6.5 | 46.58 | Good |
| P5 | 8.6 | 50.24 | Fair |
| P6 | 10.8 | 50.92 | Fair |

As a result, injection pressure applied to the bonding resin at completion of filling is smaller when the gate hole 21 is positioned closer to the communication groove 13. In other words, the deformation amount of the container part 10 caused by the injection pressure applied to the bonding resin becomes smaller when the gate hole 21 is positioned closer to the communication groove 13. Further, in order to make the pressure applied to the bonding resin become 50 MPa or less, it is desirable that the gate hole 21 be provided at a position within 8 mm in the breadthwise direction from a position where the first shape portion 41 and the communication groove 13 meet. In other words, as described above, because a length of the container part 10 in the breadthwise direction is 27 mm, it is preferable that the gate hole 21 be positioned at a distance of one-third or less of the entire distance of the rectangular shape in the breadthwise direction from a side where the communication groove 13 is formed. With this configuration, the injection pressure at a time of filling can be reduced, so that deformation caused by the injection pressure can be reduced.

<Comparison of Charging Performance in Gas Drainage Methods>

Evaluation of filling performance in the first to the fourth exemplary embodiment will be described.

Evaluation of filling performance in different gas drainage methods in the first to the fourth exemplary embodiments and a variation example are listed in Table 3 below.

Figure 10:
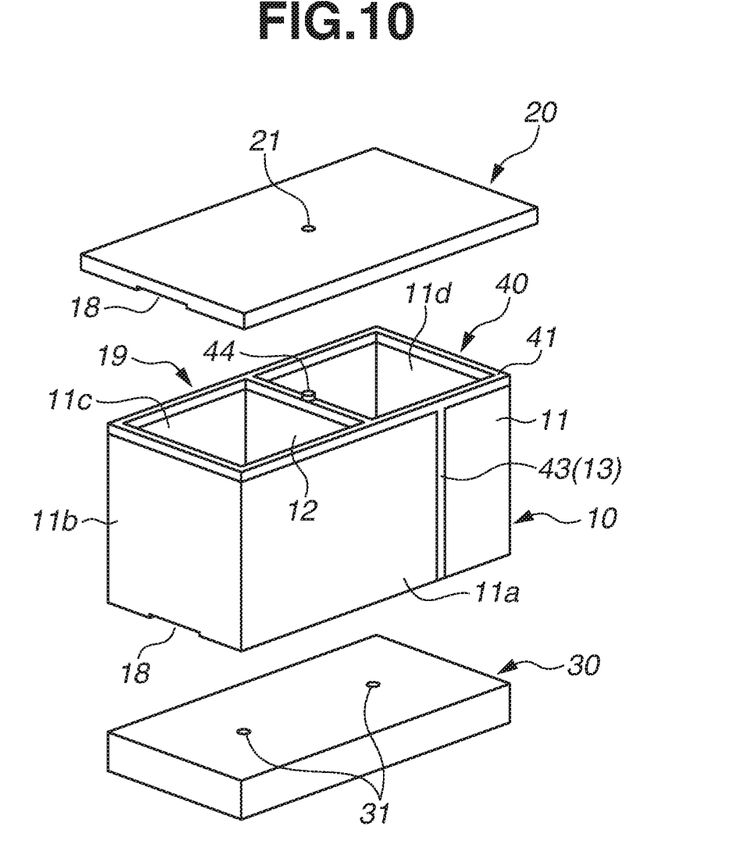
FIG. 10 is a diagram illustrating a variation example of the fourth exemplary embodiment.

As illustrated in FIG. 10, the variation example has a configuration in which grooves with a depth of 0.02 mm are provided on a part of bonding faces of the container part 10, the cover part 20, and the injection part 30 of the first exemplary embodiment as the gas drainage grooves 18.

A filling level of the bonding resin with respect to the groove is evaluated. If the bonding resin can be filled up to a flowing end portion thereof, filling performance is evaluated as "Good", and if a flowing pressure can be reduced while bonding resin can be filled up to the flowing end portion, the filling performance is evaluated as "Excellent".

TABLE 3

|  | Gas Drainage | Evaluation |
|---|---|---|
| First Exemplary Embodiment | None | Good |
| Fourth Exemplary Embodiment | Through-hole | Excellent |
| Variation Example | Groove | Good |

As illustrated in Table 3, an effect of improving the filling performance was not obtained by the variation example in which the gas drainage grooves 18 are provided on the hollow part $1_1$ of the first exemplary embodiment. This is because the gas drainage grooves 18 are squashed when the container part 10, the cover part 20, and the injection part 30 are pressed and bonded together, so that the effect of gas drainage cannot be obtained. On the other hand, in the fourth exemplary embodiment in which through-holes communicating with the grooves to be filled with bonding resin are provided, the through-holes are formed in a compression direction. Therefore, the through-holes are not squashed, and thus the filling performance can be improved.

Possibility of Other Exemplary Embodiments

In the first to the third exemplary embodiments, although the hollow part 1 serving as a container for storing a liquid which includes the container part 10 having the hollow portion 19 has been described, the exemplary embodiment is not limited thereto. The present disclosure is applicable to any bonded part configured of three or more parts that are bonded by shape portions at two or more places. Further, when the bonded part constitutes a container, the container may store any substance such as a gas or a powder instead of a liquid.

Further, in the first to the third exemplary embodiments, although a configuration in which bonding resin is injected and filled through a single gate hole has been described, the configuration is not limited thereto, and gate holes may be provided at two or more places. In particular, the present disclosure is applicable even in a case where the number of parts to be bonded is four or more while the shape portions are provided at three or more places, and bonding resin is introduced and filled into the shape portions via communication paths at two or more places.

Further, in the first to the third exemplary embodiments, the first shape portion 41 has been formed by forming the cover groove 22 on the cover part 20. However, the groove may be formed on the edge face of the wall portion 11 or the partition wall portion 12, or may be formed on the edge faces of both of the wall portion 11 and the partition wall portion 12. Further, in the first to the third exemplary embodiments, although the second shape portion 42 has been formed by forming the bottom groove 16 on the container part 10, the groove may be formed on the injection part 30, or may be formed on both of the container part 10 and the injection part 30.

Furthermore, in the first to the third exemplary embodiments, although the communication paths have been formed by forming the communication grooves 13 on the wall portion 11, the communication paths may be formed by forming grooves on a mold, or may be formed by forming grooves on both of the wall portion 11 and the mold. In a case where the grooves are formed on the mold, the communication portion 43 formed of bonding resin will be projected from the outer face of the wall portion 11. In that case, the projected portions may be cut in a post processing to obtain a hollow container having a flat outer surface.

Further, in the first exemplary embodiment, each of the communication grooves 13 has been formed at a position between the position on the outer side of the partition wall portion 12 and the corner portion 11R, and in the second exemplary embodiment, each of the communication grooves 13 has been formed at a position on the outer side of the partition wall portion 12. Furthermore, in the third exemplary embodiment, each of the communication grooves 13 has been formed on the corner portion 11R. However, the communication groove 13 does not have to be arranged at only a particular place, and may be arranged at combination of two or more different places (i.e., the communication grooves 13 are formed at four or more places). In particular, the communication grooves 13 may be formed at both of the position on the outer side of the partition wall portion 12 and the corner portion 11R. By combining the two or more arrangement places, injection pressure can be dispersed more preferably, so that further reduction of the deformation amount can be expected. Furthermore, the communication grooves 13 may be formed at two or more places between the position on the outer side of the partition wall portion 12 and the corner portion 11R. In other words, the number of communication grooves 13 is not limited to two, and a dispersion effect of injection pressure can be further expected if the number thereof is increased.

Further, in the first to the third exemplary embodiments, the wall portion 11 of the container part 10 formed into a rectangular shape has been described. However, the shape thereof is not limited thereto, and the present disclosure is applicable to any shape such as a cylindrical shape. For example, in the case of such a shape as the resin manifold described in Japanese Patent Application Laid-Open No. 3-67056, communication paths may be formed on outer walls of cylindrical shape portions, or may be formed on shape portions that connect the cylindrical shape portions.

Further, in the first to the third exemplary embodiments, as a bonding material used for the container part 10, the cover part 20, and the injection part 30, a resinous material consisting of PPE, PS, and 35% of GF has been described as an example. However, the resinous material is not limited thereto, and a resinous material of another type may be also used. For example, another resinous material such as polycarbonate/acrylonitrile butadiene styrene (PS/ABS), polystyrene (PS), or high impact polystyrene (HIPS) may be also used.

Figure 11A:
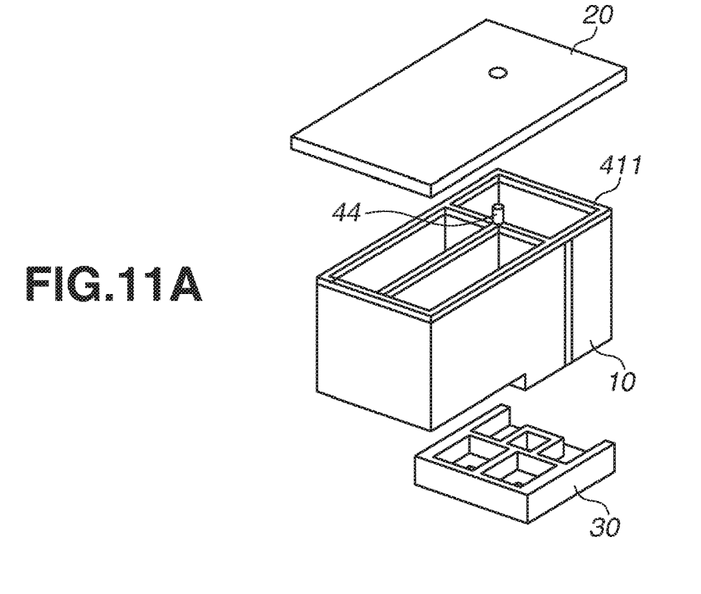
FIG. 11A is an exploded perspective diagram of the hollow part.
Figure 11B:
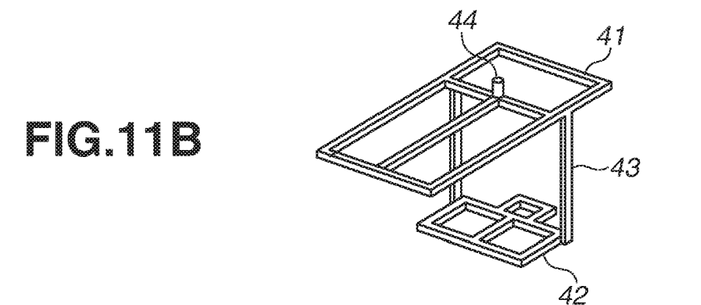
FIG. 11B is a partial schematic perspective diagram illustrating only a portion of bonding resin.
Figure 11C:
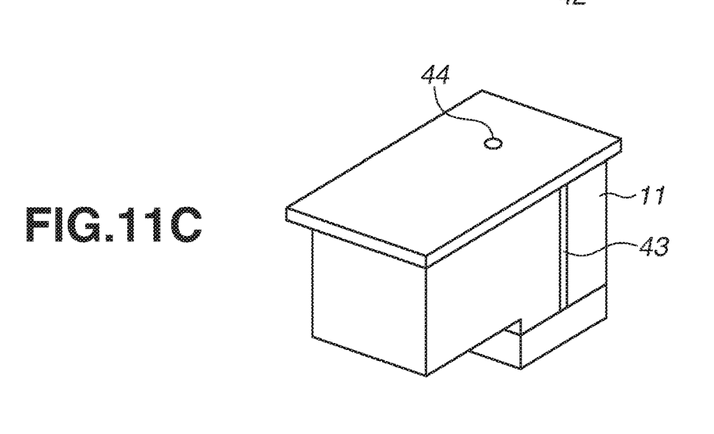
FIG. 11C is an external perspective diagram of the hollow part.

Further, as another exemplary embodiment, FIGS. 11A, 11B, 11C illustrate an ink cartridge used for an inkjet printer, to which the present disclosure is applied. In FIGS. 11A, 11B, and 11C, the same reference numerals are applied to portions having functions similar to those illustrated in FIGS. 1A, 1B, and 1C, and descriptions thereof will be omitted.

Although the injection part 30 serving as an injection head for discharging ink stored in the container part 10 has been described as an example, an exemplary embodiment is not limited thereto. For example, even if an injection head is already provided on a printer, the present disclosure can be applied preferably to an injection part 30, serving as an ink tank, having an attachment function for being attached to the injection head provided on the printer. Because the ink cartridge or the ink tank has to be divided into a plurality of rooms in order to store sponge or ink, generally, a partition wall portion coupled to an inner side of a wall portion is formed thereon. By arranging the third shape portion on the outer side of a portion where the partition wall portion is coupled to the wall portion, a cover part (second part), a container part (first part), and an injection part (third part) can be bonded together by injecting the bonding resin without deforming the hollow container part (first part).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2016-158630, filed Aug. 12, 2016, and No. 2017-138546, filed Jul. 14, 2017, which are hereby incorporated by reference herein in their entirety.

What is claimed is:

1. A bonded part comprising:
a first part; and
a second part;
wherein the first part includes a wall portion and a space portion surrounded by the wall portion,
wherein a first shape portion formed of bonding resin is arranged at a position between the second part and the wall portion, and
wherein the first shape portion includes a convex portion that passes through an internal portion of the second part and penetrates to an opposite side of the first part.

2. The bonded part according to claim 1, wherein the convex portion is provided more than one.

3. The bonded part according to claim 1, wherein the wall portion is formed into a rectangular shape when the wall portion is viewed from a side on which the first shape portion is arranged.

4. The bonded part according to claim 1, further comprising:
a third part;
wherein a second shape portion formed of the bonding resin is arranged at a position between the wall portion and the third part, and
wherein a third shape portion formed of the bonding resin which connects the first shape portion and the second shape portion is arranged on the wall portion.

5. The bonded part according to claim 4, wherein the second shape portion includes a convex portion that passes through an internal portion of the third part and penetrates to an opposite side of the first part.

6. The bonded part according to claim 5, wherein the convex portion is provided more than one.

7. The bonded part according to claim 4, wherein the first shape portion and the second shape portion are connected by a plurality of the third shape portions.

8. The bonded part according to claim 4,
wherein the first part includes a partition coupled to an inner side of the wall portion so as to divide the hollow portion, and
wherein the third shape portion is arranged at a position on an outer side of the portion where the partition is coupled to the wall portion.

9. The bonded part according to claim 4, wherein the wall portion is formed into a rectangular shape when the wall portion is viewed from a side on which the first shape portion is arranged.

10. The bonded part according to claim 9, wherein the third shape portion is arranged on the wall portion at a corner portion of the rectangular shape.

11. The bonded part according to claim 10, wherein the convex portion is positioned at a distance of one-third or less of an entire distance of the rectangular shape in a breadthwise direction from a side on which the third shape portion is arranged.

12. An ink tank comprising:
a bonded part including:
a first part; and
a second part;
wherein the first part includes a wall portion and a space portion surrounded by the wall portion,
wherein a first shape portion formed of bonding resin is arranged at a position between the second part and the wall portion, and wherein the first shape portion includes a convex portion that passes through an internal portion of the second part and penetrates to an opposite side of the first part.

13. The ink tank according to claim 12, further comprising:
a third part;
wherein a second shape portion formed of the bonding resin is arranged at a position between the wall portion and the third part, and
wherein a third shape portion formed of the bonding resin which connects the first shape portion and the second shape portion is arranged on the wall portion.

14. The ink tank according to claim 13,
wherein the first part includes a partition coupled to an inner side of the wall portion so as to divide the hollow portion, and
wherein the third shape portion is arranged at a position on an outer side of the portion where the partition is coupled to the wall portion.

15. An ink cartridge comprising:
a bonded part including:
a first part; and
a second part,
wherein the first part includes a wall portion and a space portion surrounded by the wall portion,
wherein a first shape portion formed of bonding resin is arranged at a position between the second part and the wall portion, and
wherein the first shape portion includes a convex portion that passes through an internal portion of the second part and penetrates to an opposite side of the first part.

16. The ink cartridge according to claim 15, further comprising:
a third part;
wherein a second shape portion formed of the bonding resin is arranged at a position between the wall portion and the third part, and
wherein a third shape portion formed of the bonding resin which connects the first shape portion and the second shape portion is arranged on the wall portion.

17. The ink cartridge according to claim 16, wherein the first part includes a partition coupled to an inner side of the wall portion so as to divide the hollow portion, and
wherein the third shape portion is arranged at a position on an outer side of the portion where the partition is coupled to the wall portion.

* * * * *